United States Patent
Willian et al.

(10) Patent No.: US 7,912,892 B2
(45) Date of Patent: Mar. 22, 2011

(54) SYSTEM AND METHOD FOR PARALLEL CONVERSION, COMPILATION, AND DISTRIBUTION OF CONTENT

(75) Inventors: Kenneth Willian, Princeton, NJ (US); Gerald Hofmann, Burlington, NJ (US); Dirk Leas, Princeton, NJ (US)

(73) Assignee: Educational Testing Service, Princeton, NJ (US)

(*) Notice: Subject to any disclaimer, the term of this patent is extended or adjusted under 35 U.S.C. 154(b) by 96 days.

(21) Appl. No.: 10/627,381

(22) Filed: Jul. 25, 2003

(65) Prior Publication Data

US 2005/0021859 A1    Jan. 27, 2005

(51) Int. Cl.
*G06F 15/16* (2006.01)

(52) U.S. Cl. ......... 709/200; 709/203; 709/204; 709/246

(58) Field of Classification Search .................. 709/200, 709/203–207, 246; 434/350
See application file for complete search history.

(56) References Cited

U.S. PATENT DOCUMENTS

| | | | |
|---|---|---|---|
| 6,184,878 B1* | 2/2001 | Alonso et al. ................. | 725/109 |
| 6,247,050 B1* | 6/2001 | Tso et al. ....................... | 709/224 |
| 6,366,650 B1* | 4/2002 | Rhie et al. ................... | 379/88.13 |
| 6,988,138 B1* | 1/2006 | Alcorn et al. ................. | 709/225 |
| 7,039,643 B2* | 5/2006 | Sena et al. ............................ | 1/1 |
| 7,219,120 B2* | 5/2007 | Hui ............................... | 709/225 |
| 2001/0037379 A1* | 11/2001 | Livnat ........................... | 709/219 |
| 2002/0049842 A1* | 4/2002 | Huetsch et al. ............... | 709/225 |
| 2002/0155419 A1* | 10/2002 | Banerjee et al. .............. | 434/322 |
| 2002/0156812 A1* | 10/2002 | Krasnoiarov et al. ......... | 707/513 |
| 2002/0182578 A1* | 12/2002 | Rachman et al. ............. | 434/350 |
| 2003/0054328 A1* | 3/2003 | Stuppy et al. ................. | 434/350 |
| 2003/0123622 A1* | 7/2003 | Gifford et al. ............. | 379/88.13 |
| 2003/0177203 A1* | 9/2003 | Crook ........................... | 709/219 |
| 2003/0198935 A1* | 10/2003 | Wen et al. ..................... | 434/350 |
| 2004/0015862 A1* | 1/2004 | Dunn ............................. | 717/124 |
| 2004/0024897 A1* | 2/2004 | Ladd et al. .................... | 709/231 |
| 2004/0109197 A1* | 6/2004 | Gardaz et al. ................ | 358/1.15 |
| 2005/0021859 A1 | 1/2005 | Willian et al. | |
| 2005/0034065 A1* | 2/2005 | Weight ......................... | 715/513 |

* cited by examiner

*Primary Examiner* — Joshua Joo
(74) *Attorney, Agent, or Firm* — Jones Day

(57) ABSTRACT

Systems and methods for parallel conversion, compilation, and distribution of content are disclosed. An application interface may be provided that enables a user to request the conversion of content items into formats well suited for presentation. The request may include a set of deliverables. Each deliverable may include an associated content item and a corresponding associated format to which to convert the associated content item. The request may be processed by a "pipeline" application. The pipeline application calls existing applications or proprietary applications associated with a delivery channel, and the pipeline application may customize the content items for conversion into the corresponding formats. The pipeline application may convert the associated content items using a plurality of parallel processing threads, each thread corresponding to an associated deliverable, whereby each thread converts the associated content item to the corresponding associated format. The pipeline application may compile the converted content, and distribute the compiled content to selected presentation devices.

19 Claims, 6 Drawing Sheets

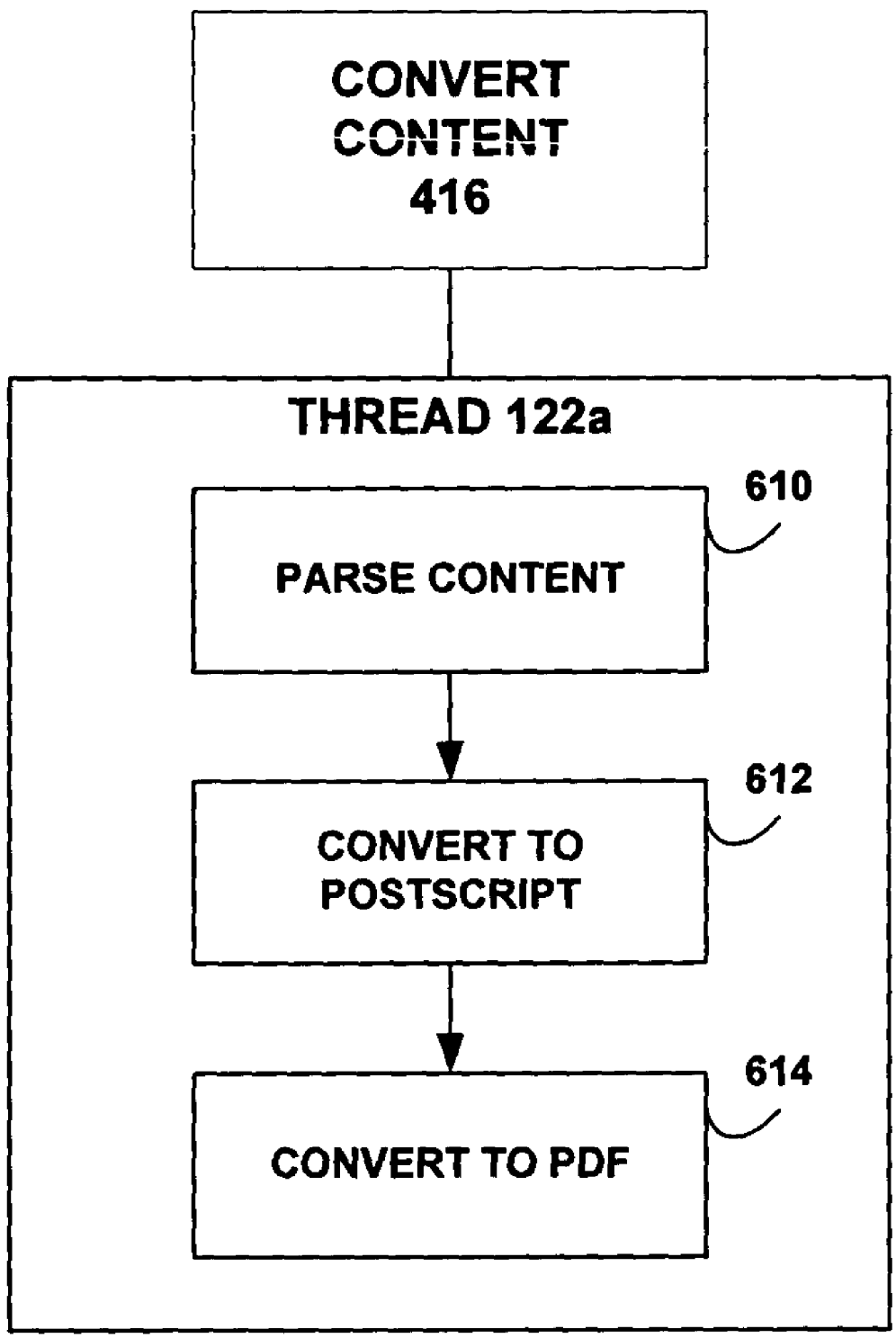

SYSTEM AND METHOD FOR PARALLEL CONVERSION, COMPILATION, AND DISTRIBUTION OF CONTENT

FIELD OF THE INVENTION

The present invention relates to the field of providing content, and, more specifically, to converting content into different formats and compiling and distributing the converted content.

BACKGROUND OF THE INVENTION

Content providers define content in a wide variety of formats. For example, extensible markup language (XML) is a commonly used format that enables designers to create customized tags, thereby enabling the transmission, validation, and interpretation of data between applications. Content defined in XML includes a hierarchy of elements and attributes. For example, a test defined in XML may include a highest level element specifying a type of test such as, for example, a mathematics test. A next level element may specify a section of the test such as, for example, geometry. A next level element may specify an individual question, and a next level element may specify elements of the test question such as, for example, a question text ("stem"), the correct answer ("key"), and a set of possible answers ("distracters").

XML is particularly suited for defining content for a variety of transmissions, including the Internet. For example, the mathematics test discussed above may be distributed from a server to a "presentation" client at a test presentation center via the Internet. A user interface such as, for example, a web browser running at the presentation client may be used to request, receive, and present the test. The test may be displayed to a test taker on a display device such as, for example, a monitor attached to the presentation client. The test taker may interact with the test using input devices such as, for example, a keyboard and a mouse. Feedback related to presentation of the test such as, for example, test answers and personal information about the test taker may be submitted from the presentation client back to the server.

In addition to presenting content using a web browser, it is often desirable to present content using alternative presentation mediums. For example, it may be desirable to present a standard printed or "published" version of the mathematics test. Furthermore, it may be desirable to present an audible version of the test using technology such as, for example, interactive voice response (IVR). Consequently, it may be desirable to convert content from a format such as XML to alternative formats that are specific to the alternative presentation mediums. For example, portable document format (PDF) is a file format developed by Adobe Systems of San Jose, Calif., that is well suited for distributing and presenting a printed version of content. The "WAV" file format is a file format well known in the art of content.

In addition to converting content into such alternative formats, it is often also desirable to compile such converted content so that it may be distributed as a single compilation. For example, it may be desirable to compile a published PDF version and a WAV version of the mathematics test and to distribute the single compilation to multiple presentation clients. The distribution of such a compilation may enable, for example, an audible version of a test to be presented to visually impaired test takers and a printed version of a test to be delivered to hearing impaired test takers. Furthermore, for example, the converted versions of the mathematics test may be bundled with an XML file that specifies a list of authorized test delivery centers to which the mathematics test should be distributed. Additionally, it may also be desirable to bundle another XML file that specifies a list of registered test takers at each such authorized delivery center.

Thus, there is a need for a processing and publishing "pipeline" for parallel conversion, compilation, and distribution of content. It is desired, for example, that such a pipeline provide the application framework and interface to enable a user to request that a plurality of content items be converted, in parallel, to a plurality of different formats. It is further desired, for example, that the application framework and interface to enable a user to request the compilation and distribution of such converted content items.

SUMMARY OF THE INVENTION

An application framework and interface may be provided that enables a user to request the conversion of content items into formats well suited for presentation. The request may include a set of deliverables. Each deliverable may include an associated content item and a corresponding associated format to which to convert the associated content item. The request may also include selected presentation devices or delivery channels to which to distribute the converted content items. The request may also include customization options related to the presentation of the content items at the selected presentation devices or delivery mechanisms.

The request may be processed by a "publishing pipeline" application. The pipeline application may log the request in a request history and retrieve the content items from a database. The pipeline application may prepare the content items for conversion into the corresponding formats. Such preparation may include, for example, retrieving the content items from a content database and customizing the content items. The pipeline application may convert the associated content items using a plurality of parallel processing threads, each thread corresponding to an associated deliverable, whereby each thread converts the associated content item to the corresponding associated format. The pipeline application may compile the converted content, and distribute the compiled content to the selected presentation devices over a selected delivery channel.

The distributed content may be received and presented at the selected presentation devices or delivery channel. A printer attached to a presentation device may be used, for example, to present a printed version of content. A speaker attached to a presentation device may be used, for example, to present an audible version of content. Feedback may be generated based on the presentation of the content.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 6 is flowchart of an exemplary method for content conversion in accordance with the present invention.

DETAILED DESCRIPTION OF ILLUSTRATIVE EMBODIMENTS

Figure 1:
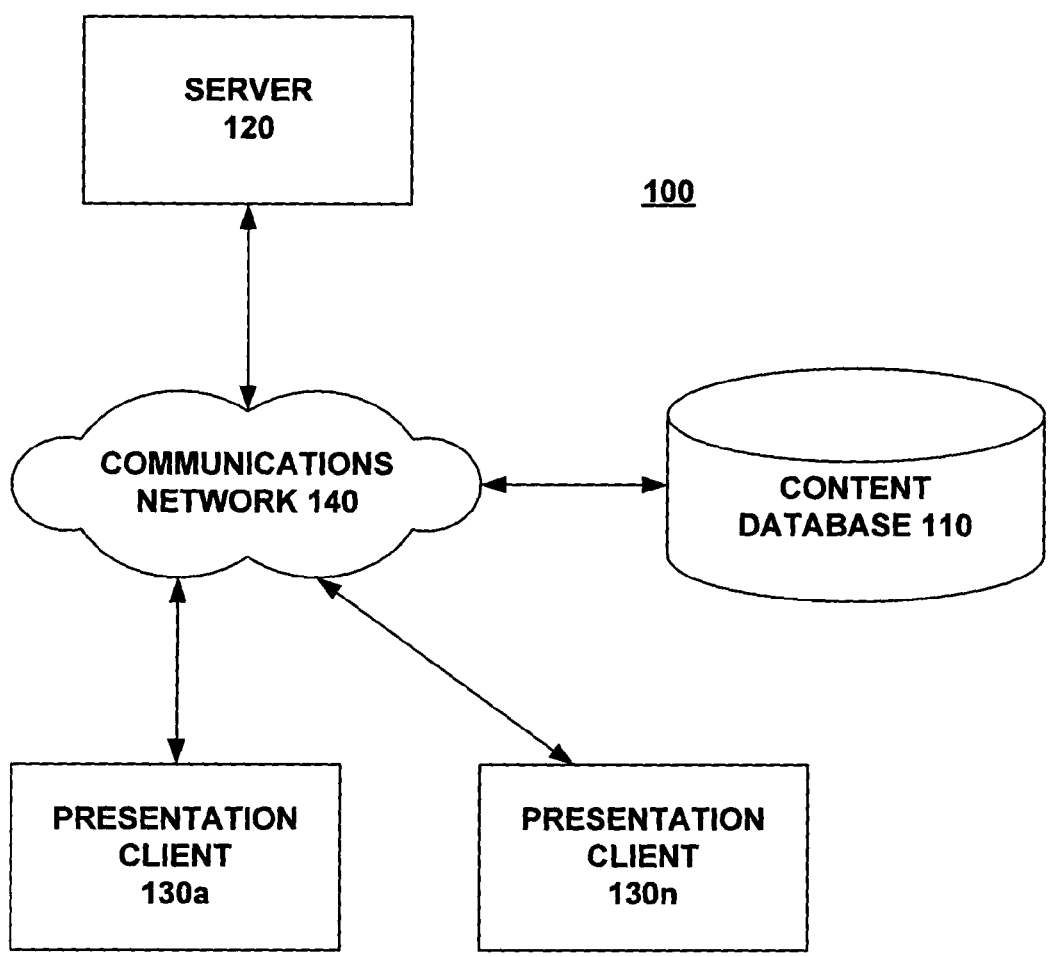
FIG. 1 is a block diagram of an exemplary conventional content distribution and presentation system.

Systems and methods that meet the above-mentioned objects and provide other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Exemplary Conventional Content Distribution and Presentation System

An exemplary conventional content distribution and presentation system 100 is shown in FIG. 1. Generally, content items may be stored at content database 110. Such content items may be retrieved by server 120 via communications network 140 and distribution to presentation clients 130a-n via communications network 140. The distributed content items may be received and presented at presentation clients 130a-n.

Content database 110 may be, for example, a relational database management system (RDBMS) that enables the storage and manipulation of content. As should be appreciated, multiple databases or other content storage sources may be used in accordance with the present invention. Content may include items such as text, video, and audio items. Specifically, for example, such content items may include articles, novels, tests, movies, songs, and reports.

Presentation clients 130a-n and server 120 may be computing devices such as, for example, personal computers (PC's). Communications network 140 may be a fixed-wire or wireless network which may be a local area network (LAN), wide area network (WAN), intranet, the Internet, or other computer network. If communications network 140 is the Internet, for example, then server 120 can be a Web server with which the presentation clients 130a-n may communicate via any of a number of known communication protocols, such as, hypertext transfer protocol (HTTP), simple mail transfer protocol (SMTP) or file transfer protocol (FTP).

Presentation clients 130a-n can be equipped with a Web browser to gain access to the server 120. Presentation clients 130a-n may be located at presentation facilities and may be used in connection with attached presentation devices such as, for example, monitors, speakers, or printers. Such monitors may be used, for example, for presenting computer based tests. Such speakers may be used, for example, for displaying computer based versions of content. Such printers may be used, for example, for presenting "published" or printed versions of content. Presentation clients 130a-n may also be used in connection with attached input devices such as, for example, keyboards, mice, or microphones, which enable interaction with the presented content. Feedback related to presentation of the content may be submitted from presentation clients 13-a-n back to server 120 via communication network 140.

Figure 2:
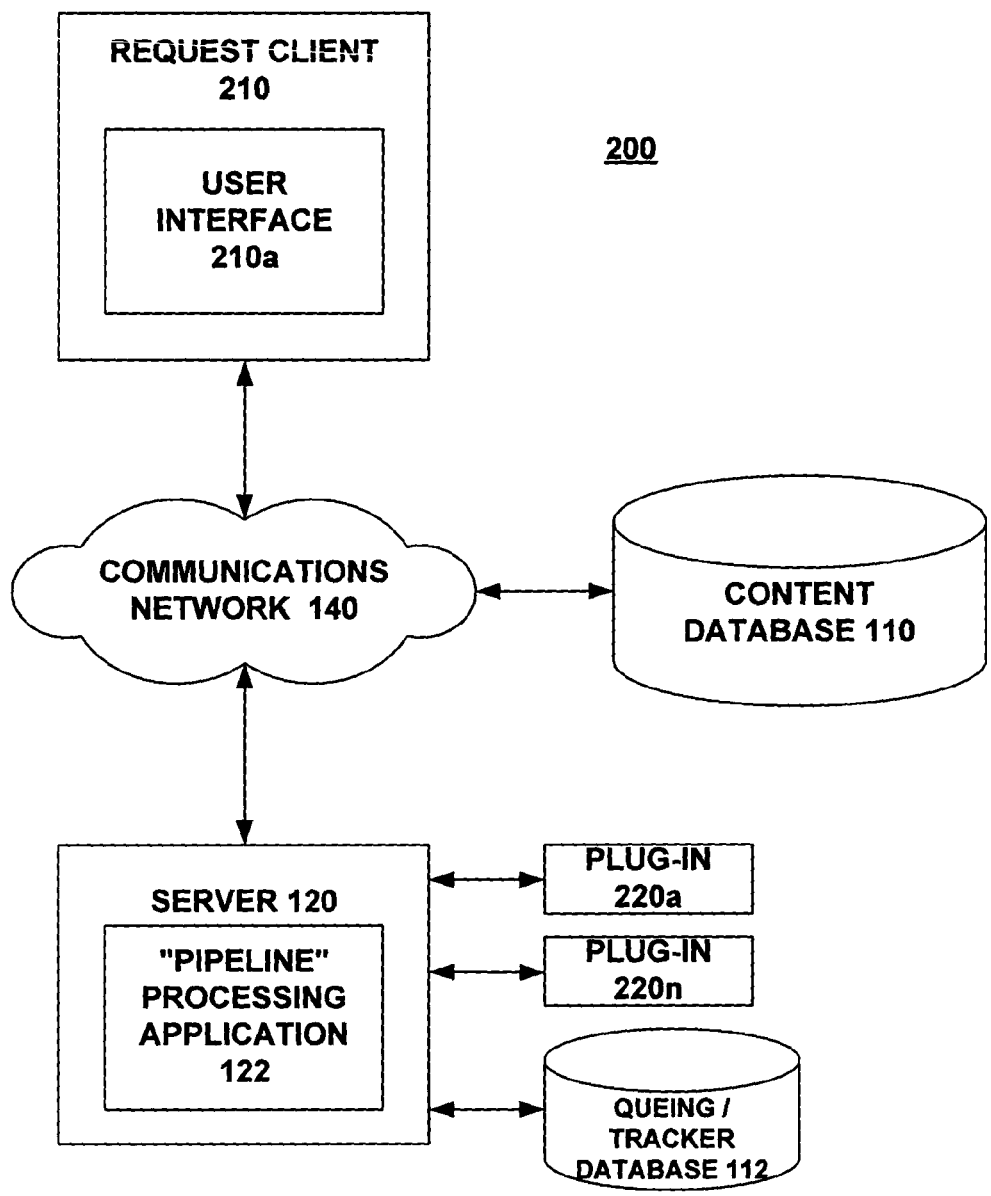
FIG. 2 is a block diagram of an exemplary content conversion, compilation, and distribution system in accordance with the present invention.

Systems and Methods for Content Retrieval, Conversion, Compilation, and Distribution An exemplary content conversion, compilation, and distribution system 200 in accordance with the present invention is shown in FIG. 2. Generally, request client 210 provides a user interface 210a for a participating user to request parallel conversion, compilation, and distribution of content. Such a request may be submitted to server 120 via communications network 140. Pipeline processing application 122 running at server 120 may process the request by retrieving content from content database 110, converting the content to selected file formats in parallel, compiling the converted content, and distributing the compiled content. Plug-ins 220a-n may be used in connection with server 120 to convert content to selected file formats.

Request client 210 may be a computing device such as, for example, a PC. As should be appreciated, request client 210 may be one of presentation clients 130a-n of FIG. 1. User interface 210a may be an application running at request client 210. User interface 210a may be a software application enabling communication with server 120. If, for example, communications network 140 is the Internet, then user interface 210a may be a Web browser. If, for another example, the communications network is a LAN, then the user interface 210a may be another application that is making the request. As should be appreciated, communications between request client 210 and server 120 may be embedded communications.

Figure 3:
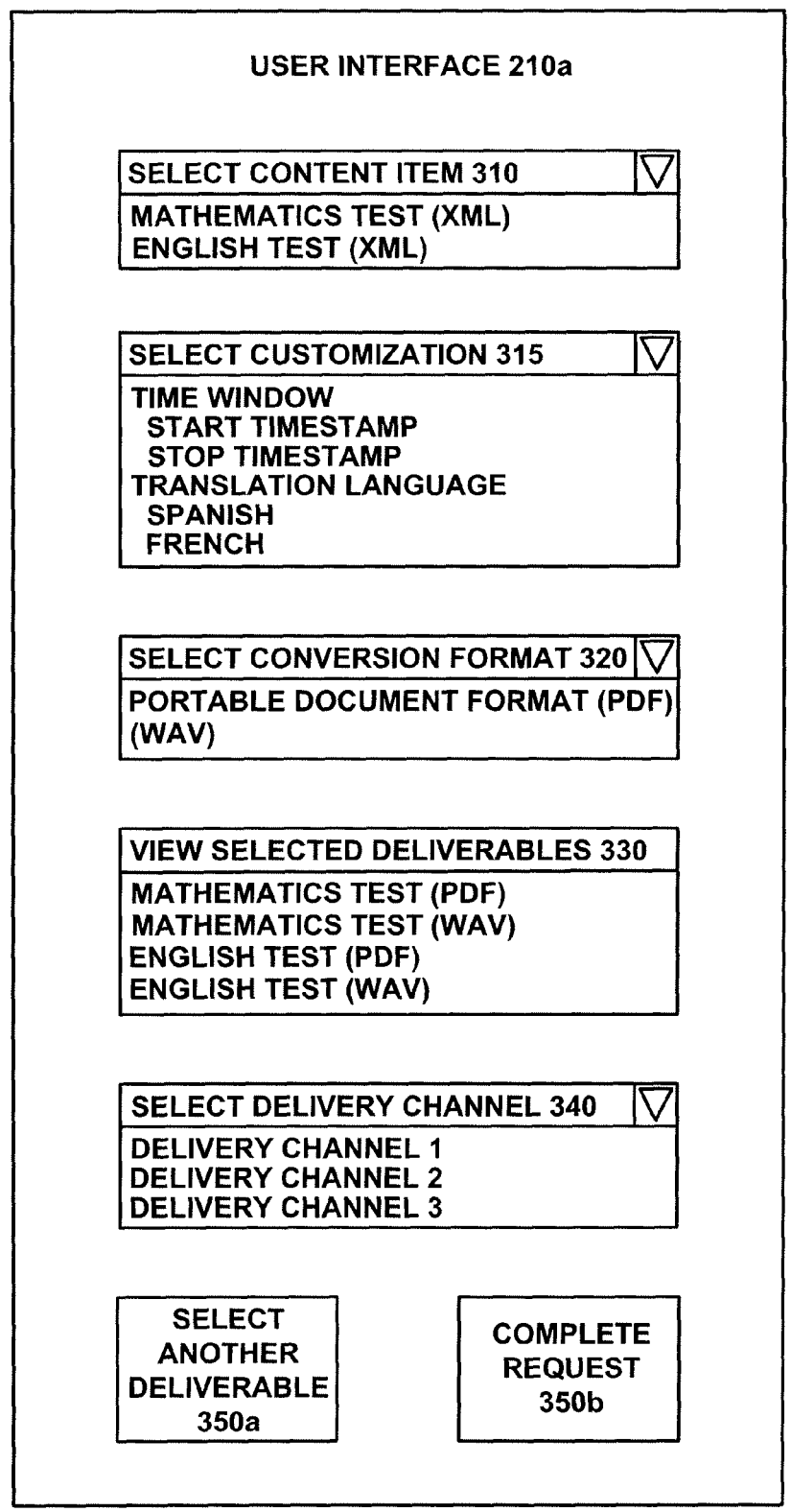
FIG. 3 is an exemplary user interface for requesting conversion, compilation, and distribution of content in accordance with the present invention.

User interface 210a generally enables a participating user to request content items to be converted in parallel, compiled, and distributed. An exemplary user interface 210a in accordance with the present invention is shown in FIG. 3. As should be appreciated, although exemplary user interface 210a is described with respect to test content, a user interface in accordance with the present invention is not limited to use in connection with test content and may be used in connection with any type of content. User interface 210a may be presented via a display device such as, for example, a monitor attached to request client 110. The user may be authorized to access user interface 300 based on, for example, a valid password or identifier.

Select content item drop down menu 310 enables the user to select content items to be retrieved, converted, compiled, and distributed. As should be appreciated, select content item drop down menu 310 and other drop down menus 320 and 340 need not necessarily be drop down menus and may, for example, be traditional menu sets including folders and documents, lists of hyperlinks, or separate windows. Content item menu 310 includes exemplary content items such as "Mathematics Test" and "English Test". The content items included in content item menu 310 may be stored at content database 110. Such content items may be defined in a format such as, for example, extensible markup language (XML), that is well suited for transmitting and presenting content over the Internet or other delivery channels. A separate authorization may be required for the user to request conversion and distribution of each individual content item shown in content item menu 310.

Select conversion format drop down menu 320 enables the user to select formats to which to convert menu items selected from content item menu 310. Conversion format menu 320 includes the exemplary conversion formats portable document format (PDF) and "WAV". PDF is a file format developed by Adobe Systems of San Jose, Calif., that is well suited for distributing and presenting a printed version of content. The "WAV" file format is a file format well known in the art of content provision that is well suited for presenting audible versions of content. For example, if a printed version of the "Mathematics Test" is desired, the "Mathematics Test" may be converted from XML to PDF. If an audible version of the "Mathematics Test" is also desired, then "Mathematics Test" may be also converted from XML to WAV. As should be appreciated, the present invention is not limited to conversion into PDF and WAV file formats. Allowing for the conversion of XML to any delivery channel specific formats is contemplated in accordance with the present invention.

Plug-ins 220a-n of FIG. 2 may be used in accordance with the present invention in connection with server 120 to parse and convert content to the file format selected in conversion format menu 320 or another selected file format. Plug-ins 220a-n may be commercially available pug-ins, other applications, or proprietary. For example, XML pull parser (XPP) is a plug in that is well known in the art of content parsing that may be used to parse XML content and convert the parsed content to other formats such as, for example, PostScript, which is a format well known in the art developed by Adobe Systems of San Jose, Calif. An XPP plug-in may, for example, parse an XML file for elements and attributes necessary to convert the content from XML to another selected format.

View selected deliverables field 330 enables the user to view content that he has selected to be retrieved and converted. Each deliverable includes a content item selected from content item menu 310 and a conversion format selected from conversion format menu 320. View selected deliverables field 330 shows that the "Mathematics Test" and the "English Test" have been selected to be converted from an XML file into both a PDF file and a WAV file.

Select delivery channels drop down menu 340 enables the user to a delivery channel over which to distribute the deliverables shown in view deliverables field 330. Select delivery channels drop down menu 340 includes exemplary delivery channels "1", "2", and "3". "Select another deliverable" prompt 350a enables the user to select another deliverable to add to view selected deliverables field 330. "Complete request" prompt 350b enables the user to complete and submit his request.

User interface 210a may engage any application that possesses content that needs to be converted and distributed via a specific delivery channel. Furthermore, user interface 210a is not limited to the menus and fields 310-340 shown in FIG. 3 and other additional features, menus, and configuration options are contemplated in accordance with the present invention. For example, "customization" menus may be included which enable a user to specify a time window in which content or portions of content may be presented at presentation clients 130a-n. The time window may me defined by a start timestamp and a stop timestamp. The timestamp may be a value maintained by server 120. Such a time window is a security feature which may prevent unauthorized presentation of the content at an improper time. Another customization menu, for example, may enable the user to select a language such as, for example, Spanish or French, to which to translate content. Another customization option may enable, for example, a presentation authorization. Such a presentation authorization may be, for example, a valid password or identifier that is required to access and present each deliverable at each presentation client 130a-n.

Figure 4:
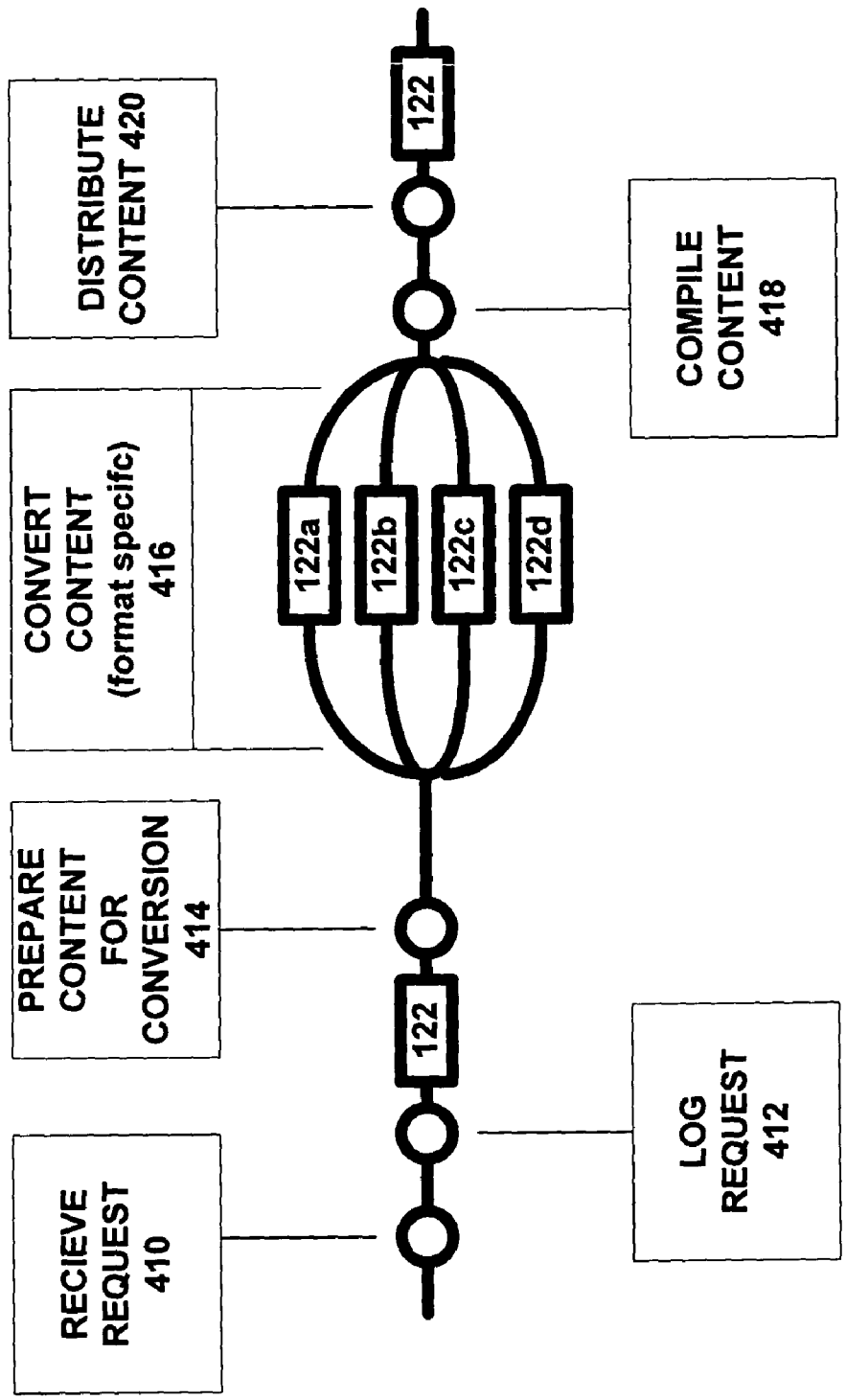
FIG. 4 is an exemplary processing pipeline for content conversion, compilation, and distribution in accordance with the present invention.

An exemplary method for content conversion, compilation, and distribution in accordance with the present invention is shown in FIG. 4. Generally, a request to convert in parallel, compile, and distribute content is received and processed by pipeline application 122 running at server 120. The request may include a set of deliverables, each deliverable including a content item and a corresponding format to which to convert the content item. The request may also include instructions to compile the deliverables and distribute them over selected delivery channels. Pipeline application 122 logs the request and prepares each content item for conversion. Pipeline application 122 then divides processing into a plurality of concurrent processing "threads" 122a-d, each thread corresponding to an associated deliverable. Each production thread converts its associated content item to its selected conversion format. Pipeline application 122 then compiles the converted deliverables from each processing thread 122a-d and distributes the compilation to presentation clients 130a-n for presentation.

At step 410, a request is received at server 120. The request may be made at request client 210 and submitted to server 120 via communications network 140. User interface 210a at request client 210 may be provided to enable a participating user to make the request.

The request may include a set deliverables. Each such deliverable may include a selected content item and a selected file format to which to convert the selected content item. For example, a set of deliverables may include a "Mathematics Test" and an "English Test to be converted from XML format into PDF format and into WAV format.

The request may also include customization requests for each deliverable. Customization requests may be included to adjust the content prior to its conversion and delivery. For example, the request may include a time window in which content or portions of content may be presented at presentation clients 130a-n. The time window may me defined by a start timestamp and a stop timestamp. The timestamp may be a value maintained by server 120. Such a time window is a security feature which may prevent unauthorized presentation of the content at an improper time. The request may also include a language such as, for example, Spanish or French, to which to translate content. The request may also include content objects such as, for example, pictures, video content, and audio content to be converted inserted into each deliverable. The request may also require authorization such as for example, a valid password or identifier to retrieve and present each deliverable at presentation clients 130a-n.

At step 412, pipeline application 122 logs the request. Step 412 is an optional step. Each deliverable within the request may be logged and cued for processing. Server 120 may employ a cueing service to manage the cueing of requests. Each received request may be stored in a request history maintained by a cueing/tracker database 112. Each request entry in the history may include a corresponding identifier and information such as, for example, a request start timestamp, a current status, and a request complete timestamp. The history enables a user to determine the status of all requests processed by pipeline application 122.

At step 414, pipeline application 210a prepares the requested content for conversion. Preparing the content may include, for example, retrieving the requested content and customizing the requested content. Content may be retrieved from content database 110 via communications network 140. As should be appreciated, multiple databases or other content storage sources may be used in accordance with the present invention.

Content may be customized to adjust the content prior to its conversion and delivery. Customization of the content may include, for example, verifying the validity of the content by, for example, verifying that the requested content is present in content database 110 in the appropriate format. Customization of content may also include verifying the user's authorization to access the content, inserting a tag specifying a time window in which the content may be presented at presentation clients 130a-n, translating the content to a language such as, for example, Spanish or French, or otherwise modifying the content in accordance with an instruction from the user.

At step 416, pipeline application 210a converts each deliverable to its requested file format. The processing steps required to convert each deliverable are format specific and may be dependent on customizations selected by the user. Consequently, at step 418, pipeline application 122 divides the conversion of deliverables into a plurality of concurrent processing threads 122a-d. Each such thread 122a-d corresponds to the conversion of an associated deliverable. For example, thread 122a may process conversion of the "Mathematics Test" from an XML format into a PDF format. Thread 122b may process the conversion of the "Mathematics Test" from an XML format into WAV format. Thread 122c may process conversion of the "English Test" from an XML format into a PDF format. Thread 122b may process the conversion of the "English Test" from an XML format into WAV format.

Figure 5:
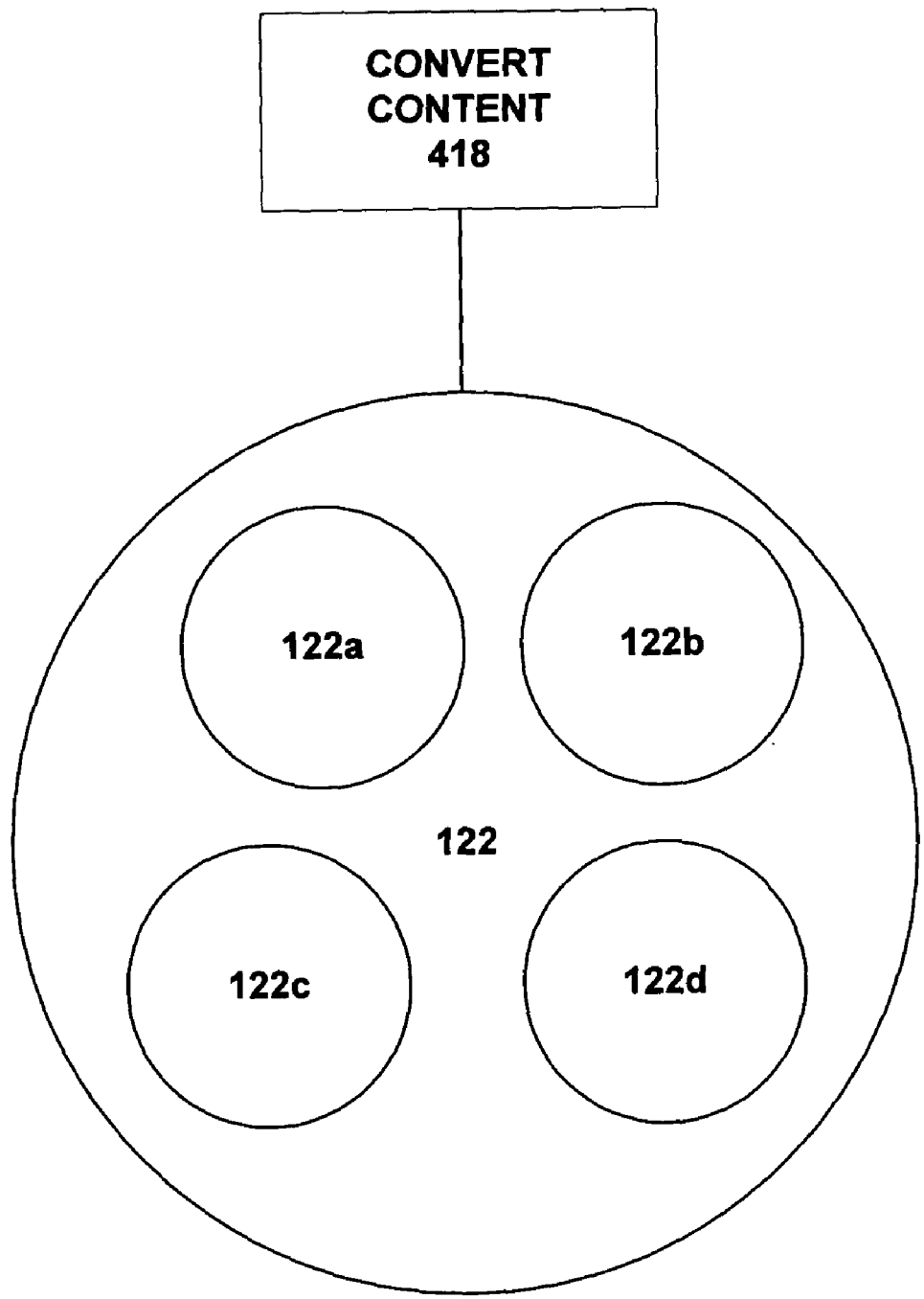
FIG. 5 is a cross sectional view of the content conversion portion of the pipeline of FIG. 4 in accordance with the present invention.

A cross sectional view of pipeline application 122 at conversion step 416 in accordance with the present invention is shown in FIG. 5. Pipeline 122 is divided into threads 1220a-d, each corresponding to an associated deliverable. As should be appreciated, pipeline application 122 is not limited to four processing threads and may be divided into any number of processing threads corresponding to any number of selected deliverables. The division of processing into concurrent threads 122a-d enables processing steps specific to the conversion of each deliverable to be performed concurrently without the need to serially complete the conversion of a first deliverable before the conversion of a second deliverable may be commenced.

A flowchart of an exemplary method for content conversion in accordance with the present invention is shown in FIG. 6. The processing steps shown in FIG. 6 are described in connection with thread 122a, corresponding to the conversion of the "Mathematics test" from an XML file into a PDF file. However, the method shown in FIG. 6 is not limited to converting XML content to PDF content and may be applied to conversion of other such content into other such formats by modifying steps 610-614 in accordance with the particular content, selected conversion format, and customization requests associated with the corresponding deliverable.

At step 610, thread 122a parses the "Mathematics Test" to retrieve information such as, for example, elements and attributes necessary to convert the test from XML to PDF format. Thread 122a may employ a commercially available plug-in such as, for example, an XPP plug-in to parse the XML file.

At step 612, the parsed XML content may be converted into a page description (PDL) language such as, for example, PostScript. Such a PDL may be an object oriented language that treats images including fonts as collections of geometrical objects rather than as bit maps. Preferably, the size of such images may be changed using PDL commands.

At step 614, the PDL content is converted to a file format such as, for example, PDF, which is well suited for distributing and presenting a "published" or printed version of the content. Once converted to PDF, the content may be distributed to presentation clients 130a-n and displayed on an attached monitor or printed using an attached printing device. Acrobat Reader is a reading application developed by Adobe Systems of San Jose, Calif., which is required at presentation clients 130a-n to present PDF content.

Referring back to FIG. 4, at step 418, the content converted by threads 120a-d is compiled. Such converted content is preferably compiled into a single compilation file such as, for example, a tape archive (TAR) file. TAR is a file format well known in the art of content provision that is suitable for distribution of compiled content over communications network 140. For example, a plurality of PDF and WAV files may be compiled into a single TAR file.

At step 420, the compilation may be distributed to the delivery channels selected from delivery channels drop down menu 340. Once distributed, the compiled deliverables may be presented at presentation clients 130a-n. Presentation clients 130a-n may be used in connection with attached presentation devices such as, for example, monitors, speakers, or printers. Such monitors may be used, for example, for presenting computer based tests. Such speakers may be used, for example, for presenting interactive voice response (IVR) tests. Such printers may be used, for example, for presenting printed "pencil and paper" tests. Presentation clients 130a-n may also be used in connection with attached input devices such as, for example, keyboards, mice, or microphones, which enable interaction with the presented content.

Presentation clients 130a-n may have access to a timestamp maintained by server 120 to ensure that distributed content is presented within a desired time window. Presentation clients 130a-n may also require a valid password or identifier to access the distributed content.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for converting deliverables, the method comprising:

preparing a plurality of deliverables for conversion from an initial format to a plurality of different file type formats suitable for presentation, each deliverable of the plurality of deliverables including an associated content item and a corresponding associated format to which to convert the associated content item, each corresponding associated format including at least one specified translated human language;

wherein preparing the plurality of deliverables for conversion comprises customizing each of the associated content item using customization menus prior to the conversion by selecting a human language to translate a deliverable to the specified translated human language, specifying a valid identifier that is required to access and present a deliverable of the plurality of deliverables at each of a plurality of presentation devices, and specifying a time window defining a start timestamp and a stop timestamp during which a deliverable of the plurality of deliverables may be accessed at the plurality of presentation devices;

converting associated content items of the plurality of deliverables using a plurality of parallel processing threads to create converted deliverables in the plurality of different file type formats, each thread of the parallel processing threads corresponding to an associated deliverable, whereby said each thread converts the associated content item from the initial format to the corresponding associated format;

compiling the converted deliverables in the plurality of different file type formats into a single compilation file for distribution over a plurality of delivery channels;

posting the single compilation file as content to the plurality of delivery channels; and delivering the content to the plurality of presentation devices.

2. The method of claim 1, further comprising receiving a request from a user to convert the plurality of deliverables to the plurality of different file type formats suitable for presentation, the request including a selected delivery channel over which to distribute the converted deliverables.

3. The method of claim 1, wherein the corresponding associated format to which to convert the associated content item is external to the associated content item.

4. The method of claim 1, wherein the corresponding associated format indicates a file format to which to convert an associated content item.

5. The method of claim 1, wherein converting includes translating text of a content item to the specified translated human language when the specified translated human language differs from a language of the text of the content item.

6. The method of claim 1, wherein a content item is associated with multiple file type formats to which to convert the content item.

7. The method of claim 1, wherein the associated content item is defined in extensible markup language, wherein one of the corresponding associated format is a WAV file format.

8. The method of claim 1, wherein the associated content item is an exam, wherein the exam is administered by one or more of the presentation devices.

9. A method for conversion of deliverables, the method comprising:

providing a user interface that enables a user to enter a request for converting a plurality of deliverables from an initial format to a plurality of different file type formats suitable for presentation, each deliverable of the plurality of deliverables including an associated content item and a corresponding associated format to which to convert the associated content item, each corresponding associated format including at least one specified translated human language;

preparing associated content items of the plurality of deliverables for conversion based on corresponding associated formats;

wherein preparing the associated content items for conversion comprises customizing each of the associated content item using customization menus prior to the conversion by selecting a human language to translate a deliverable to the specified translated human language, specifying a valid identifier that is required to access and present a deliverable of the plurality of deliverables at each of a plurality of presentation devices, and specifying a time window defining a start timestamp and a stop timestamp during which a deliverable of the plurality of deliverables may be accessed at the plurality of presentation devices;

converting the associated content items using a plurality of parallel processing threads to create converted deliverables in the plurality of different file type formats, each thread of the parallel processing threads corresponding to an associated deliverable, whereby said each thread converts the associated content item from the initial format to the corresponding associated format;

compiling the converted deliverables in the plurality of different file type formats into a single compilation file for distribution over a plurality of delivery channels;

posting the single compilation file as content to the plurality of delivery channels; and delivering the content to the plurality of presentation devices.

10. The method of claim 9, wherein providing the user interface comprises providing the user interface that enables the user to enter the request including a selected delivery channel over which to distribute the converted deliverables.

11. The method of claim 9, wherein the corresponding associated format to which to convert the associated content item is external to the associated content item.

12. The method of claim 9, wherein the corresponding associated format indicates a file format to which to convert an associated content item.

13. The method of claim 9, wherein converting includes translating text of a content item to the specified translated human language when the specified translated human language differs from a language of the text of the content item.

14. The method of claim 9, wherein a content item is associated with multiple file type formats to which to convert the content item.

15. A computer-implemented system for converting deliverables, the system comprising:

a server computer;

a database accessible by the server computer, the server computer configured to execute steps, comprising:

preparing a plurality of deliverables for conversion from an initial format to a plurality of different file type formats suitable for presentation, each deliverable of the plurality of deliverables including an associated content item and a corresponding associated format to which to convert the associated content item, each corresponding associated format including at least one specified translated human language;

wherein preparing the plurality of deliverables for conversion comprises customizing each of the associated content item using customization menus prior to the conversion by selecting a human language to translate a deliverable to the specified translated human language, specifying a valid identifier that is required to access and present a deliverable of the plurality of deliverables at each of a plurality of presentation devices, and specifying a time window defining a start timestamp and a stop timestamp during which a deliverable of the plurality of deliverables may be accessed at the plurality of presentation devices;

converting associated content items of the plurality of deliverables using a plurality of parallel processing threads to create converted deliverables in the plurality of different file type formats, each thread of the parallel processing threads corresponding to an associated deliverable, whereby said each thread converts the associated content item from the initial format to the corresponding associated format;

compiling the converted deliverables in the plurality of different file type formats into a single compilation file for distribution over a plurality of delivery channels;

posting the single compilation file as content to the plurality of delivery channels; and delivering the content to the plurality of presentation devices.

16. The system of claim 15, further comprising receiving a request from a user to convert the plurality of deliverables to the plurality of different file type formats suitable for presentation, the request including a selected delivery channel over which to distribute the converted deliverables.

17. The system of claim 15, wherein the corresponding associated format to which to convert the associated content item is external to the associated content item.

18. The system of claim 15, wherein the corresponding associated format indicates a file format to which to convert an associated content item.

19. The system of claim 15, wherein a content item is associated with multiple file type formats to which to convert the content item.

* * * * *